United States Patent
Barber et al.

(10) Patent No.: US 8,353,696 B2
(45) Date of Patent: Jan. 15, 2013

(54) SEMI-RIGID TOOL HAVING SECTIONS THAT VARY FROM ONE ANOTHER IN RIGIDITY

(75) Inventors: Scott Barber, East Cowes (GB); Philip Stanley Grainger, East Cowes (GB)

(73) Assignee: GKN Aerospace Services Limited, Isle of Wight (GB)

( * ) Notice: Subject to any disclaimer, the term of this patent is extended or adjusted under 35 U.S.C. 154(b) by 0 days.

(21) Appl. No.: 12/863,327

(22) PCT Filed: Jan. 16, 2009

(86) PCT No.: PCT/GB2009/000122
§ 371 (c)(1),
(2), (4) Date: Jul. 16, 2010

(87) PCT Pub. No.: WO2009/090397
PCT Pub. Date: Jul. 23, 2009

(65) Prior Publication Data
US 2011/0024032 A1 Feb. 3, 2011

(30) Foreign Application Priority Data
Jan. 18, 2008 (GB) .................................. 0800984.7

(51) Int. Cl.
*B29C 45/33* (2006.01)
(52) U.S. Cl. ........ 425/405.2; 29/592; 29/603.9; 249/65; 425/470
(58) Field of Classification Search ............... 425/405.1, 425/405.2, 470; 249/65; 29/592, 603.9
See application file for complete search history.

(56) References Cited

U.S. PATENT DOCUMENTS

| | | | | |
|---|---|---|---|---|
| 3,008,859 A | * | 11/1961 | Smack | 264/45.2 |
| 3,520,961 A | * | 7/1970 | Nagase et al. | 264/71 |
| 5,433,418 A | * | 7/1995 | Nowak et al. | 249/139 |
| 5,500,166 A | | 3/1996 | Sasaki et al. | |
| 5,527,414 A | | 6/1996 | Dublinski et al. | |
| 5,593,633 A | * | 1/1997 | Dull et al. | 425/389 |
| 5,645,670 A | | 7/1997 | Reinfelder et al. | |
| 5,688,353 A | | 11/1997 | Dublinski et al. | |
| 6,071,458 A | * | 6/2000 | Mossi | 264/294 |
| 6,071,619 A | * | 6/2000 | De Winter | 428/423.1 |
| 2002/0020934 A1 | * | 2/2002 | Hinz | 264/40.6 |

(Continued)

FOREIGN PATENT DOCUMENTS
DE 20116817 U1 1/2002
(Continued)

OTHER PUBLICATIONS
PCT International Search Report and Written Opinion, PCT/GB2009/000122, May 6, 2009.
(Continued)

*Primary Examiner* — Tim Heitbrink
(74) *Attorney, Agent, or Firm* — Quarles & Brady LLP

(57) ABSTRACT

The present invention relates to a manufacturing tool (13, 14) and method for use in forming polymer matrix composite products such as carbon fiber composite products. The tool comprising a first and a second portion defining a cavity (15) therebetween in which the product is built before curing. The rigidity of the second portion (13) of the tool is selected based on the required deflection of the second portion of the tool under the curing conditions, in order to maintain pressure on the laminate during the entire cure. The second upper portion (13) is shown haring varying thicknesses (16A, 16B and 16C) which results in different rigidity of these regions.

15 Claims, 6 Drawing Sheets

U.S. PATENT DOCUMENTS

| | | |
|---|---|---|
| 2003/0098520 A1 | 5/2003 | Cournoyer et al. |
| 2006/0068170 A1 | 3/2006 | Hanson |
| 2007/0108655 A1* | 5/2007 | Aramburu et al. ............ 264/255 |
| 2011/0163480 A1* | 7/2011 | Herkner ........................ 264/489 |

FOREIGN PATENT DOCUMENTS

| | | |
|---|---|---|
| EP | 0319449 A2 | 6/1989 |
| EP | 0549468 A1 | 6/1993 |
| EP | 1092529 A1 | 4/2001 |
| EP | 1243401 A1 | 9/2002 |
| JP | 2002347037 A | 12/2002 |
| JP | 2006181736 A | 7/2006 |
| JP | 2008036889 A | 2/2008 |
| WO | WO0224370 A2 | 3/2002 |
| WO | WO2008059286 A1 | 5/2008 |
| WO | WO2009015441 A1 | 2/2009 |

OTHER PUBLICATIONS

PCT International Preliminary Report on Patentability, PCT/GB2009/000122, May 17, 2010.

* cited by examiner

SEMI-RIGID TOOL HAVING SECTIONS THAT VARY FROM ONE ANOTHER IN RIGIDITY

CROSS REFERENCE TO RELATED APPLICATIONS

This application represents the national stage application of International Application PCT/GB2009/000122 filed 16 Jan. 2009, which claims priority of Great Britain Patent Application No. 0800984.7 filed 18 Jan. 2008, which are incorporated herein by reference in their entirety for all purposes.

The present invention relates to a tool and associated methods for use in the manufacture of polymer matrix composites parts.

Polymer Matrix Composites (PMC), also known as Fibre-Reinforced Polymers (FRP) could use glass, carbon, aramid or hybrid fibres as a reinforcement. They can be formed by laying a series of fibre fabric or mesh layers into a mould corresponding to the shape of the desired component. The fabric may be pre-impregnated with a resin or a resin may be applied to the carbon fibre layers as the product is built in the mould. The resin is then cured to form the final product.

Various manufacturing techniques are known in the art for forming Fibre-Reinforced Polymer products, including compression moulds, closed and partially closed tooling, open mould tooling, hollow tooling and so forth. Existing manufacturing techniques, such as the techniques listed above, are generally adequate for the production of most carbon fibre products. However, significant problems arise in the manufacture of products requiring tight geometrical tolerances.

A disadvantage, in the case of production of composites using an open mould covered with a vacuum bag, is that the surface of the component in contact with the mould is controlled but the bag-side surface is not. The amount of variation in bag-side geometry is proportional to the component thickness. The thicker the section of the part, the greater the deviation can be from the nominal.

A disadvantage, in the case of production of composites using a conventional closed mould arrangement, is that once the upper and lower moulds have been coupled together the internal pressure that the inner surface of the mould applies to the part can vary. Once closed, the part is no longer subject to external pressure but instead the internal pressure within the mould becomes a function of the fluid rheology and the structural properties of the chosen composite during the curing process. The pressure applied to the part and the resulting geometry cannot therefore be controlled. These problems are generally not of concern with simple products having large tolerances but they are particularly problematic when producing parts with complex profiles such as an aerofoil. It will be appreciated that in producing aerodynamic components such as aerofoils or the like the final geometry of the product is essential to the operation of the product.

It has been established by the present applicant that existing manufacturing techniques do not allow products to be formed with the tolerances necessary for the production of some aerospace components, and in particular aerodynamic components. Specifically, it has been recognised by the applicant that existing carbon fibre manufacturing techniques such as closed mould tooling do not apply a controlled pressure to the internal component (within the mould cavity) during the curing process, resulting in poor consolidation of the resin and poor part tolerances.

The present invention provides a tooling arrangement which overcomes the problems in the art and which allows for the production of an improved component using carbon fibre or the like.

Viewed from a first aspect there is provided a polymer matrix composite product forming tool comprising a first and a second portion defining a cavity therebetween, wherein the second portion is arranged to deflect relative to the first portion under curing conditions The present invention provides a tool capable of forming thicker laminate components where open mould tooling or the like cannot be employed owing to the tight geometric control needed for many aerospace components.

Allowing a portion of the tool to deflect by a predetermined amount under curing conditions allows the pressure on the part during curing to be controlled as well as the final shape of the part being manufactured. Thus, a tool arrangement according to one aspect of the invention provides a tool and a corresponding method of manufacture which enables components with improved accuracy to be formed using any fibre and which removes the need for filling in and/or extensive machining of the resulting component. Furthermore, the tooling arrangement according to the present invention allows a solid part to be formed with improved accuracy and in accordance with tight tolerances. The invention improves the upper surface geometry of the component produced, improves upper surface finish, and gives greater control of the resin to fibre ratio. This is of particular importance for aerodynamic components such as aerofoils including fan blades and the like.

The term 'rigidity' is intended to refer to the degree of deforming ability of the second portion of the tool. In effect the second portion of the tool is provided with a degree of flexibility relative to the first portion of the tool. As pressure is applied to the tool the second portion of the tool can deform or flex relative to the first portion by virtue of its controlled rigidity. Thus, the second portion of the tool can apply a controlled curing pressure to the entire surface of the part contained within the cavity. Consequently, the consolidation of the resin within the tool is greatly improved and the geometry of the part controlled.

In effect a two-part tool is provided wherein all or part of the second portion of the tool is arranged to be semi-rigid. The term semi-rigid is intended to indicate a rigidity which is selected to allow for a degree of deflection. This degree of deflection is needed to maintain pressure on the product throughout the cure. Therefore, if the volume of the product reduces to under that of the mould cavity created by the upper and lower mould tools, then the upper mould tool (the second tool portion) can advantageously deform to reduce mould cavity volume accordingly and maintain pressure on the product.

The rigidity of the second portion is determined based on the required deflection of the second part of the tool relative to the first part of the tool under the curing pressure and temperature. The curing conditions are generally applied by means of an autoclave. Depending on the part to be manufactured the rigidity may be a uniform rigidity meaning that the entire surface deflects by the same amount. Alternatively, the second portion may be provided with a varying rigidity across its surface in order to deflect by varying amounts across the surface of the part. Rigidity may be varied depending upon localised component thickness, giving better geometry control on some areas than others.

The second portion may advantageously be provided with a peripheral region with a rigidity corresponding generally to the rigidity of the first portion of the tool and with a central region having a different and/or varying rigidity across its area. Thus, the two portions of the tool can be aligned and coupled together in a conventional manner (for example using bolts or the like) and the central area of the second portion can deflect as required to match the required geometry of the final product.

The tool may be formed of a plurality of sub-portions making up the first and second portions described above. This may for example be necessary for more complex parts. In effect the first and second portions (or first sub-portions and second sub-portions) form a mould into which the fibre and resin can be placed in a conventional way.

Generally, the first portion corresponds to a lower portion of the tool and the second portion corresponds to an upper portion of the tool. In use, the upper portion is located on top of the lower portion thereby defining the cavity between the two portions corresponding to the geometry of the product to be formed. Thus, the tool can be placed on a surface within an autoclave and pressure can be applied to the upper and lower portions of the tool.

The first tool portion, i.e. the lower portion, may be formed in a conventional way. For example, the part may be formed by milling a metal blank to create the required profile for the lower surface of the part. This advantageously allows the lower portion to support the weight of the entire tool and the un-cured product as well as allowing the tooling to be maneuvered into and out of the autoclave. This also minimises production costs. The lower portion may alternatively be formed from a composite material which may advantageously minimise the effects of dissimilar thermal expansion of the tool components.

The rigidity of the second portion of the tool (the upper portion) is determined or 'tuned' based on a number of factors, but is primarily determined based on the autoclave pressure and temperature which is to be applied to the upper tool surface. The autoclave pressure and temperature are themselves determined based on the particular materials which are to be used to make the component within the tool or mould. The determination of the required rigidity is such that at the operating autoclave pressure and temperature the upper portion of the tool deflects towards the lower portion of the tool to maintain pressure on the laminate within the tool. Too much deflection and filling will be required to finish the part and too little deflection and machining of the final part will be required. In applications such as the production of an aerofoil it is desirable to minimise any finishing manufacturing steps.

It will be recognised that the actual values of rigidity and how the rigidity varies across the upper tool will depend on the particular part being manufactured, the materials to be used to make the part and the corresponding autoclave conditions.

Once the required rigidity profile of the second portion of the tool has been determined the second portion of the tool can be manufactured with the predetermined rigidity.

The required rigidity of the upper portion of the tool may be provided in a number of ways. For example, the rigidity may be provided by selecting a particular material (having particular mechanical properties) and a cross-section thereof to provide the required rigidity. The deflection may additionally or alternatively be controlled by reinforcing all or parts of the upper portion of the tool using ribs or other reinforcing means. In one arrangement the upper tool portion may be formed of a single material to minimise costs and may be provided with varying thicknesses across the surface to provide the required rigidity across the upper tool.

Components such as aerofoils have complex profiles and the upper portion of the tool may be provided with a non-uniform rigidity across the entire surface of the part resulting in varying deflections corresponding to the varying thickness of the aerofoil shape. For example, a region of the upper part aligning with a thick cross-section of the part may have a greater rigidity than thinner outer regions of the part. Providing the upper portion with a rigidity which varies across the portion ensures that the region deflects by a predetermined amount and that an appropriate pressure is thereby applied to a corresponding region of the part. The result is that it is possible to improve geometry of specific areas of the component while maintaining pressure to the entire laminate during the curing process.

In use the part (for example an aerofoil) is built with layers of carbon fibre fabric in the lower portion of the tool to form a laminate. The upper portion is then placed onto the lower portion of the tool. The upper and lower portions may advantageously be provided with a tongue and groove arrangement disposed around the periphery of the cavity creating an aligning means to ensure the upper part aligns correctly with the lower part.

The lower portion may be provided with a recess or channel (a groove) extending around a portion of the periphery of the cavity. The upper portion may be provided with a corresponding tongue portion which engages into a portion of the channel in the lower portion so as to accurately align the two portions. The upper male portion may advantageously be arranged to be seated in a portion of the cross-section of the channel whilst leaving an unrestricted portion of cross-section to provide a passageway for air, volatile gases and/or resin, as described below.

The aerofoil is effectively sandwiched between the upper and lower portions in the cavity of the tool. In order to create the contours across the entire area of the part (i.e. to the edges of the desired part) the upper and lower portions may advantageously be provided with opposing mating surfaces which abut against each other around the edge of the part when the upper and lower portions are brought together.

So as to provide a passage through which gas, excess resin and gaseous volatiles can escape from the cavity, the mating surfaces extending around the periphery of the cavity may advantageously be provided with a porous portion through which these components (i.e. the gases and/or resin) can pass. This allows the excess components to be withdrawn (for example by means of a vacuum) from the cavity to ensure a homogenous part with uniform consolidation.

The porous portion disposed between the mating surfaces may advantageously be formed using one or more layers of carbon fibre fabric. Preferably the layers are arranged on the outer surfaces of the part i.e. on the upper and lower surfaces of the part within the cavity. These layers may advantageously extend between the mating surfaces and into the peripheral channel described above. Thus, the porosity of the fabric allows the excess gases and/or resin to pass from the cavity and into the channel arranged outside of the cavity. In effect there is provided a porous or semi-porous vacuum/bleed path through which these components can be withdrawn whilst allowing the two tool portions to be coupled together using a fabric which can reduce costs and complexity.

The outer fabric layers are preferably a dry lay cloth i.e. not pre-impregnated with resin. This provides the required porosity between the mating surfaces and additionally allows the parts of the two layers in contact with the component within the cavity to consolidate with the component on curing by migration of resin from the component to each of the outer layers. After the curing process the excess fabric material extending from the periphery of the part can be trimmed leaving a uniform consolidated finished part.

The two outer carbon fibre layers described above pass between the mating surfaces and may extend into the channel or groove formed in the lower portion of the tool as described above. Thus, the channel can act as a drainage channel or exhaust channel to receive the excess gases and resin from within the cavity. The channel is preferably arranged to extend beyond the area covered by the upper tool portion (when located on the lower portion) so as to provide a passage for excess components to pass from the cavity, through the channel and out of the tool. Using the channel as an aligning means for the upper and lower tool and simultaneously as a cavity drainage channel advantageously reduces the manufacturing costs of the tool.

Viewed from another aspect there is provided a method of manufacturing a tool for forming a fibre reinforced component, said tool comprising a first and a second portion defining a cavity therebetween, said method comprising the steps of: determining the required deflection in use of one portion of the tool relative to the other portion of the tool to form a required part; and adapting one or both portions so as to deflect in use by the predetermined amount.

Viewed from yet another aspect there is provided a method of forming an aerofoil comprising the steps of: determining for a given autoclave pressure and temperature the required deflection of each region of a first tool portion relative to a second tool portion to form a required aerofoil profile; adapting the rigidity of the first and/or second portions so as to deflect in use by the predetermined amount; and forming the aerofoil in an autoclave.

Viewed from a still further aspect there is provided a tool for forming a polymer matrix composite product, said tool comprising a first and a second portion defining a cavity therebetween, wherein the second portion of the tool is provided with a semi-rigid region disposed adjacent to the cavity.

It will be recognised that a tool arrangement and methods according to the present invention not only provides a means to form products with precise contours but is also economical to manufacture and durable for multiple uses.

Specific embodiments of the invention will now be described, by way of example only, with reference to the accompanying, figures in which.

Figure 1:
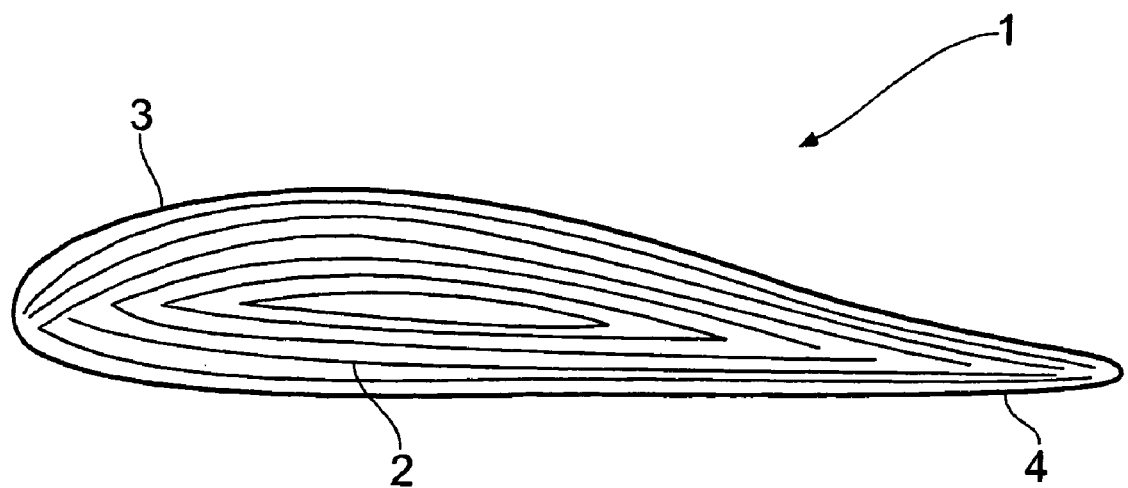
FIG. 1 shows an example of an aerofoil in cross-section.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

FIG. 1 shows an example of an aerofoil which can be manufactured according to the present invention. The aerofoil 1 is shown in cross-section and is formed of a series of carbon fibre layers 2. As shown the aerofoil is a solid part with a thicker leading region 3 and a narrow trailing region 4. It will be appreciated that this is a three dimensional part within a complex three dimensional profile.

The profile or geometry of a component of the type shown in FIG. 1 is essential to the functionality of the resulting product. Any deviation from the required geometry of such an aerofoil will be detrimental to the desired aerodynamic properties of the resulting product. It is therefore essential that the part is formed accurately to the design requirements.

Figure 2:
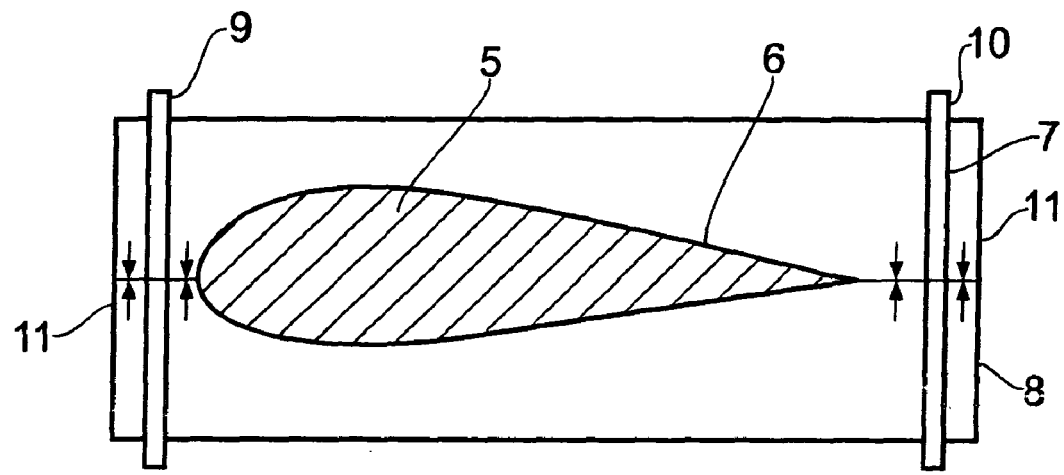
FIG. 2 shows an example of a conventional closed-mould tool.

FIG. 2 shows a conventional closed-mould tool as known in the art. The tool is shown in cross-section with an aerofoil component 5 within a cavity 6. The cavity 6 is defined by the upper half 7 of the tool and the lower part 8 of the tool.

FIG. 2 shows the tool ready to be placed in an autoclave for curing. On building the mould the two parts 7 and 8 are bolted together by bolts 9 and 10. Arrows 11 illustrate the abutment of the two parts 7 and 8. As the two parts 7 and 8 are coupled together the inner surfaces of the parts defining the cavity 6 contact the outer surface of the aerofoil 5. The part can then be cured for example in an autoclave.

Figure 2A:
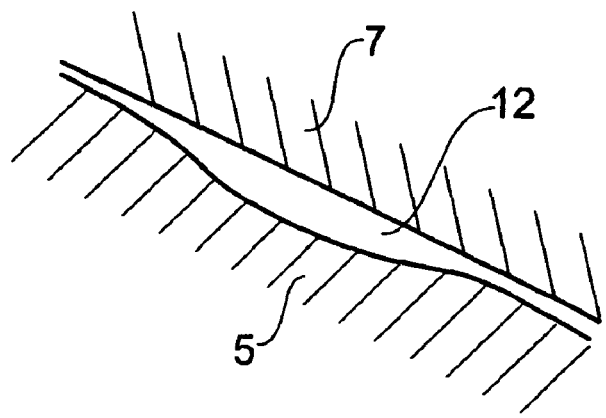
FIG. 2A shows a gap formed in a conventional tool arrangement.

One problem which has been identified with conventional tooling is that the abutment of the upper and lower parts of the tool can reduce the pressure which is applied to the part being cured. Variations in pressure within the mould cavity during curing can result in discontinuities in consolidation of the resin and carbon fibre leading to a non-homogenous product. In addition, variations in pressure can cause gaps between the cavity inner surface and the product which are seen in the finished product after it has cured. This is illustrated in FIG. 2A by the gap 12 between the upper portion 7 and the aerofoil 5.

Figure 3:
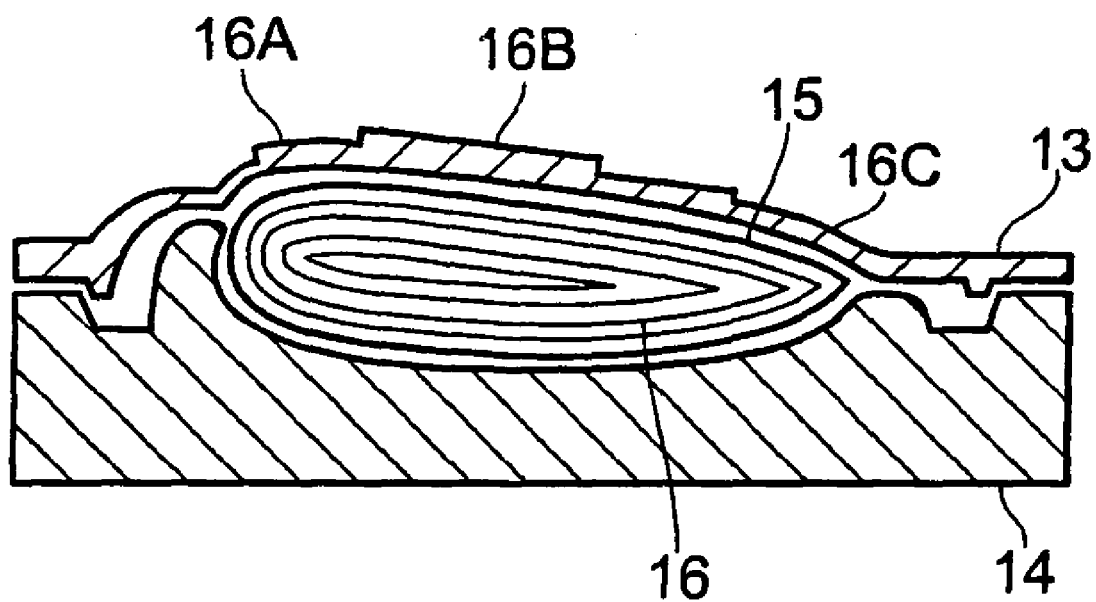
FIG. 3 shows an embodiment of the present invention in cross-section.

FIG. 3 illustrates a tool arrangement according to the present invention in cross-section. The tool comprises an upper portion 13 and a lower portion 14 defining a cavity 15 therebetween. The cavity is arranged with a profile corresponding to the aerofoil 16 shown within the cavity 15. As shown the lower portion 14 is substantially thicker than the upper portion 13. The lower portion 14 can be manufactured in the same way as a conventional tool lower portion, for example by milling.

Portion 13 differs substantially to the conventional tooling portion and is shown with varying thicknesses 16A, 16B and 16C. The thickness of the portion 13 at each individual region of the upper portion results in a different rigidity of that region. Thus, for a given autoclave pressure the individual regions 16A, 16B and 16C deflect by different amounts. As an example, region 16C at the trailing edge of the aerofoil is thinner than region 16B meaning the upper portion will deflect more under the autoclave pressure and thereby compresses the trailing edge of the aerofoil.

The amount of deflection required can be determined by computation or by testing and measuring the resulting aerofoil. The determination of the deflection and the resulting rigidity required for that deflection under a given pressure and temperature could be determined using conventional engineering techniques and will not therefore be recited here.

It will be recognised by persons skilled in the art that the rigidity may be tuned by various techniques, for example: material selection, material thickness and by reinforcing or the like.

The lower mould (first portion) can be formed from any suitable material. The portion may for example be formed of a metal, such as steel to reduce costs or it could be made from a composite to minimise the effects of thermal expansion.

The semi-rigid upper mould (second portion) could be made from carbon fibre composite such as Cyform 22 Composite Tooling Pre Preg 22-40%-3 KHS-C2X2T-220-1000-W from the supplier Cytec.

The product itself could be built from any suitable polmer matrix composite material. For example the material may be a carbon fibre material known as Tenax HTS 5631 (Trade name) manufactured by Toho Tenax together with an epoxy resin known as 977-2 (Trade name) manufactured by Cytec The contours of an aerofoil extend in three dimensions from the root of the aerofoil (normally proximate the fuselage) to the tip of the aerofoil (normally distal to the fuselage). Thus, the rigidity is determined and controlled (or tuned) in two dimensions across the upper tool portion.

Figure 4:
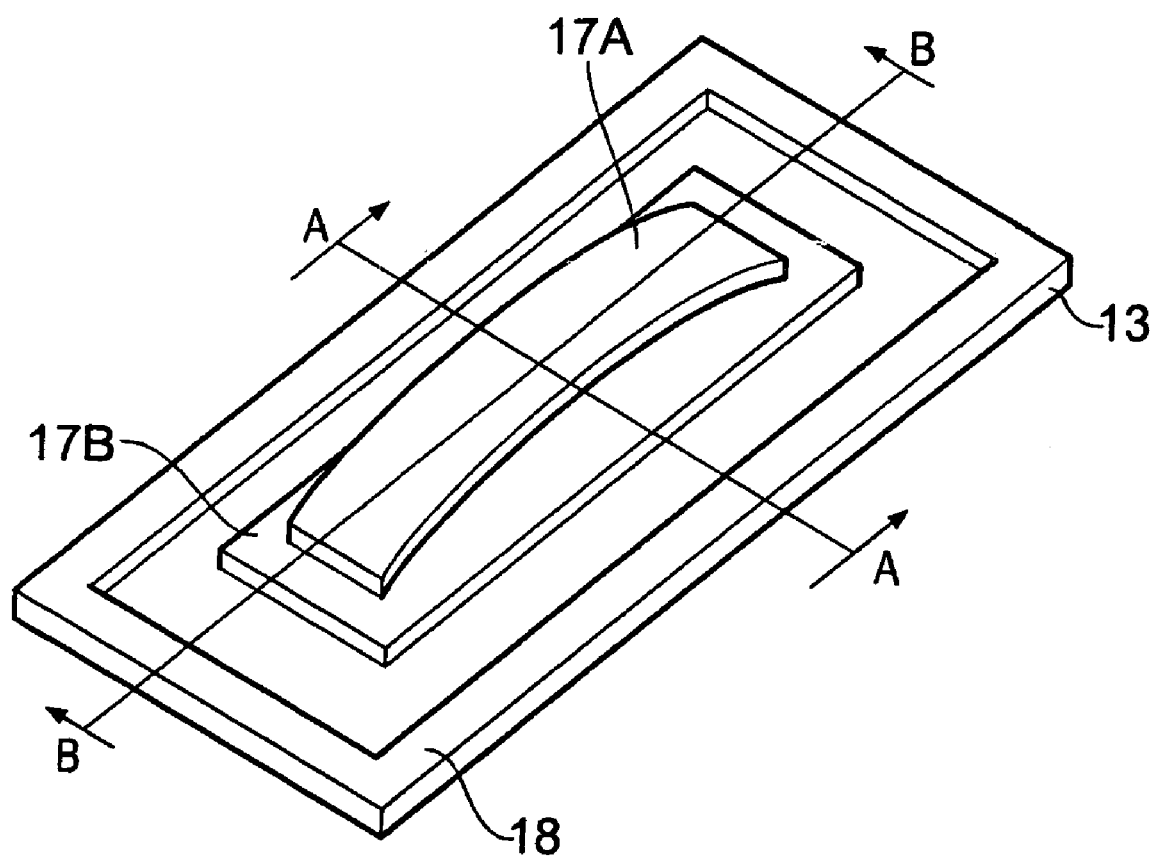
FIG. 4 shows a view of the upper tool portion.

FIG. 4 shows a view of the upper tool portion 13. Reinforcing of the upper portion is illustrated by ribs 17A and 17B extending along the length and width of the tool. The peripheral coupling section 18 is also shown with a slightly thicker cross-section. This portion engages with the lower tool portion as described below.

Figure 5:
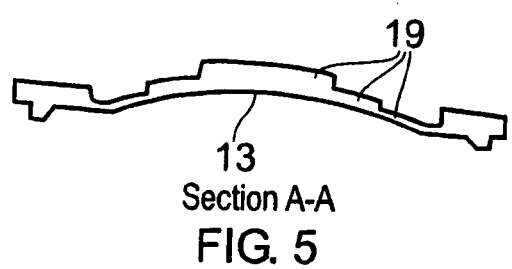
FIG. 5 shows a view through section A-A in FIG. 4.

FIG. 5 shows a view through section A-A in FIG. 4. In this embodiment the stepped portions 19 of the upper portion 13 are shown which provide the varied rigidity across the width of the aerofoil tool.

Figure 6:
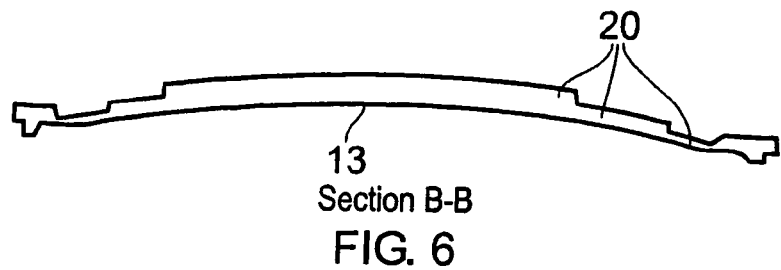
FIG. 6 shows a view through section B-B in FIG. 4.

FIG. 6 shows a view through section B-B in FIG. 4. In this embodiment the stepped portions 20 of the upper portion 13 are shown which provide the varied rigidity along the length of the aerofoil tool.

Figure 7:
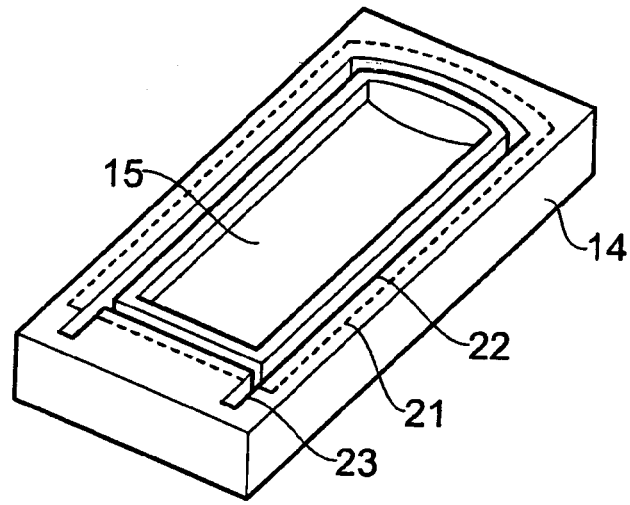
FIG. 7 shows a view of the lower tool portion.

FIG. 7 shows a view of the lower portion 14 of the tool. As discussed above this can be manufactured using conventional tool forming techniques. FIG. 7 shows the tool cavity 15 machined into the lower tool portion 14. The broken line 21 in FIG. 7 shows the position of the upper portion 13 once in position for curing. As shown the upper portion overlaps the cavity 15.

FIG. 7 also illustrates the channel 22 arranged around the periphery of the cavity 15. The channel is formed in the lower portion 14 of the tool and is located beneath the upper tool portion 13 in use. As shown the channel 22 extends to a distance 23 beyond the broken line 21 i.e. the channel extends beyond the overlapped portion of the upper tool. This thereby provides a passage from outside of the tool to the channel between the upper and lower parts. The channel is described in more detail with reference to FIGS. 8, 9 and 9A.

Figure 8:
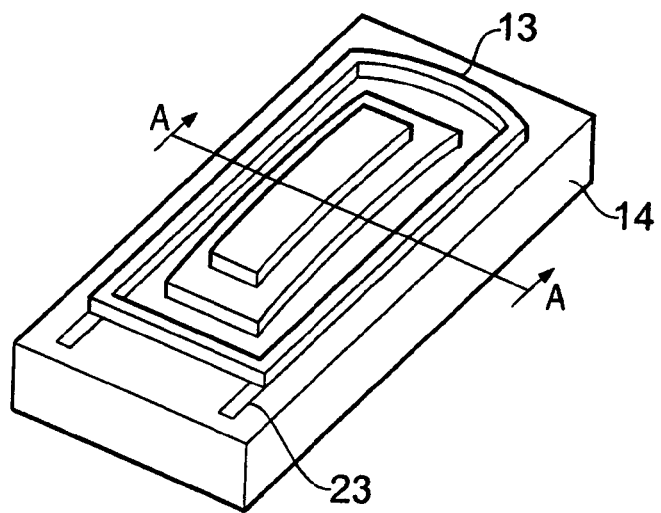
FIG. 8 shows a tool according to the present invention ready to be inserted into an autoclave.

FIG. 8 shows the tool according to the present invention ready to be inserted into an autoclave. As shown the upper and lower portions 13, 14 of the tool are in position and the channel portion 23 can be seen extending from the end of the upper portion 13.

Figure 9:
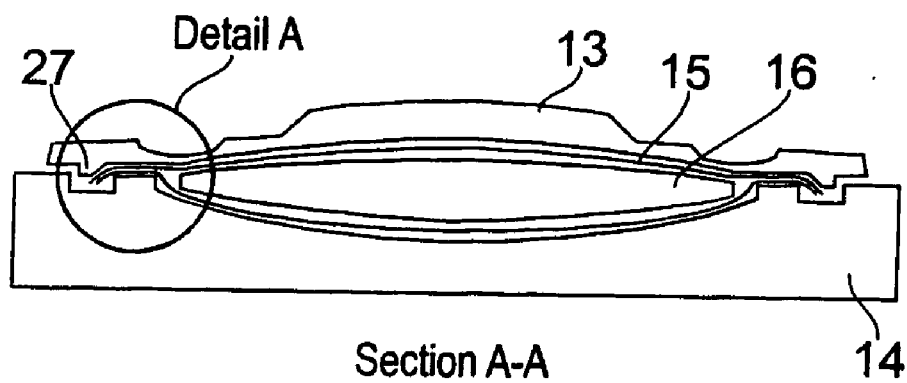
FIG. 9 shows a view through section A-A in FIG. 8.

Turning to FIG. 9, this shows a view through section A-A in FIG. 8. FIG. 9 shows the upper and lower portions 13, 14 and the aerofoil 16 contained within the tool cavity 15. Also shown are the two outer fabric layers 24, 25 around the aerofoil which are shown in more detail in FIG. 9A.

Figure 9A:
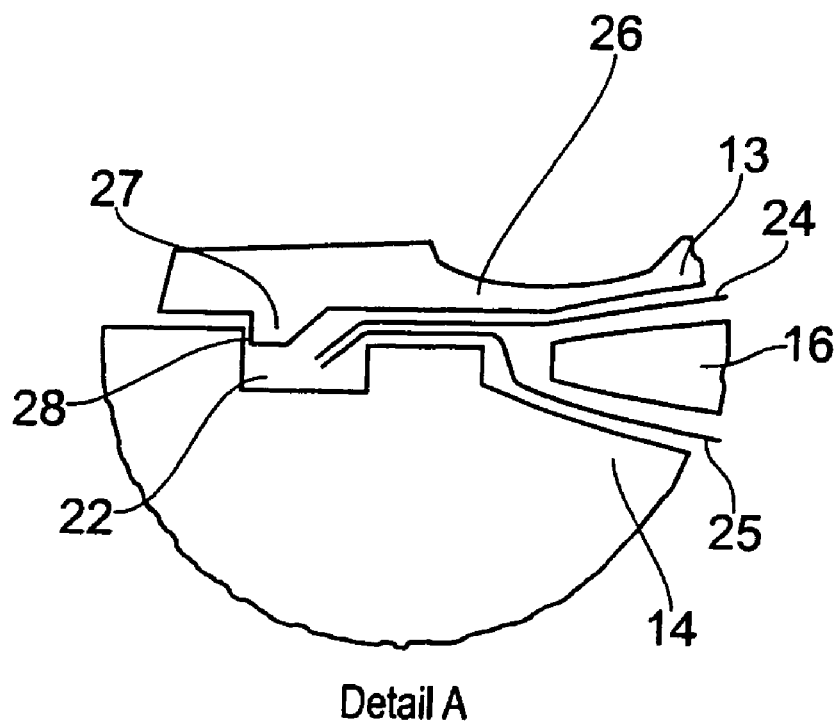
FIG. 9A shows a detail of the circled region shown in FIG. 9.

FIG. 9A shows a detail of the circled region shown in FIG. 9. The upper and lower tool portions 13, 14 are shown as well as the aerofoil 16. The upper outer fabric layer is shown as reference 24 and the lower outer fabric layer is shown by reference 25. These layers are a material corresponding to the material used to form the laminate layers of the aerofoil except that the layers are not pre-impregnated with resin as is generally the case with the layers forming the aerofoil. As shown the two outer layers are disposed between the respective tool faces and the aerofoil outer surface and extend through a narrow gap 26 between the upper and lower tool portions as shown at one edge in FIG. 9A. It will be recognised that the fabric extends through the gap all around the periphery of the tool.

The two fabric layers 24, 25 extend through the gap and into the channel 22 where they terminate. As the upper portion 13 is brought down onto the lower portion 14 the gap 26 compresses the two fabric portions together. Because of the porosity of the fabric a narrow breathing passage is creating which allows excess volatiles, gases and resin to escape from the cavity as the tool is heated and the aerofoil cured. The gases and resin are able to pass through the porous fabric and into the channel which can be coupled to a vacuum via the extended portion 23 shown in FIG. 8. Thus, the excess gases and resin can be drawn from the cavity through the porous material.

Use of the same material for the two layers 24 and 25 advantageously means that the outer layers consolidate with the aerofoil within the cavity as resin migrates through the fabric during curing. This provides a uniform outer layer which does not require machining or finishing to remove the coating later. Once the part has been cured all that is required is to machine the outer edge of the aerofoil resulting from the fabric extending through the gap 26. This is a minimal finishing operation.

As shown in FIGS. 9 and 9A the channel also serves a second purpose. As shown the upper portion 13 is provided with a male portion 27 which is itself provided with a profile that couples with the edge portion 28 of the channel 22. This acts to locate the upper portion securely in position with the lower portion. Advantageously, arranging the upper portion of the tool in this way so as to not consume the entire cross-section of the channel 22, provides an alignment means and an exhaust channel simultaneously thereby reducing manufacturing costs.

In use the component is built in the lower portion of the tool onto a dry cloth layer. A corresponding dry cloth layer is arranged over the component with both layers arranged to overlap the mating portions of the upper and lower portions of the tool and extending into the peripheral channel. The tool is inserted into an autoclave and the exhaust channel coupled to a vacuum. The product is then cured at the require temperature and pressure for the desired curing time.

It will be recognised that the various features and aspects described herein may be advantageously and conveniently used in any suitable combination. It will also be recognised that many variations may be made to the examples and aspects described herein whilst still falling within the scope of the inventions as claimed.

The invention claimed is:

1. A polymer matrix composite product forming tool comprising a first and a second portion defining a cavity therebetween under curing conditions, wherein the second portion is arranged to deflect a predetermined amount relative to the first portion under curing conditions wherein, the second portion has sections that vary from one another in rigidity that, based on curing conditions, permit deflection of the second portion in an amount corresponding to the predetermined amount relative to the first portion to reduce a volume of the cavity to correspond to a desired profile of the product.

2. A tool as claimed in claim 1, wherein the first portion is a lower portion of the tool and the second portion is an upper portion of the tool.

3. A tool as claimed in claim 1, wherein one or all of the thickness, material and geometry of the upper/second portion is/are selected to provide the determined rigidity.

4. A tool as claimed in claim 1, wherein the required deflection of the second portion is the deflection required for the internal cavity to correspond to the desired profile of the product under curing conditions.

5. A tool as claimed in claim 1, wherein the required deflection of the second portion is the deflection required to cause a predetermined pressure to be applied to the part within the cavity under curing conditions.

6. A tool as claimed in claim 1, wherein the first and second portions are provided with a surface extending around the periphery of the cavity and providing a surface against which the first and second portions abut when the two portions are brought together.

7. A tool as claimed in claim 6, wherein the first and second portions are configured to provide a channel or conduit extending from an outer edge of said tool to said surface against which the first and second portions abut when the two portions are brought together.

8. A tool as claimed in claim 6, wherein the surface is arranged to provide a passage through which volatiles and/or resin can leave the cavity during curing.

9. A tool as claimed in claim 8, wherein the passage is provided by a layer of dry fabric.

10. A tool as claimed in claim 9, wherein the regions of the dry fabric in contact with the part are arranged to be consolidated with the part during the curing process.

11. A tool as claimed in claim 1, wherein the second portion is provided with a flexible region aligning with the cavity formed within the tool to provide the required deflection.

12. A tool as claimed in claim 1, wherein the second portion is arranged to deflect in pre-determined areas only.

13. A method of manufacturing a tool as claimed in claim 1 for forming a fibre reinforced component, comprising a first and a second portion defining a cavity therebetween, said method comprising the steps of:
   determining the required deflection in use of one portion of the tool relative to the other portion of the tool to form a required part; and
   adapting one or both portions so as to deflect in use by the predetermined amount.

14. A method of forming an aerofoil using a tool as claimed in claim 1, the method comprising the steps of:
   determining for a given autoclave pressure and temperature the required deflection of each region of a first tool portion relative to a second tool portion to form a require aerofoil profile;
   adapting the rigidity of the first and/or second portions so as to deflect in use by the required deflection; and
   forming the aerofoil in an autoclave.

15. A tool for forming a polymer matrix composite product, said tool comprising a first and a second portion defining a cavity therebetween, wherein the second portion of the tool is provided with a semi-rigid region disposed adjacent to the cavity, said semi-rigid region having sections that vary from one another in rigidity that, based on the curing conditions, permit deflection of the second portion in varying amounts relative to the first portion to reduce a volume of the cavity to correspond to a desired profile of the product.

* * * * *